United States Patent

Watanabe et al.

Patent Number: 5,365,641
Date of Patent: Nov. 22, 1994

[54] CORD STOPPER

[75] Inventors: Hirokazu Watanabe, Toyama; Akishige Utazu, Nara, both of Japan

[73] Assignee: Yoshida Kogyo K.K., Tokyo, Japan

[21] Appl. No.: 9,678

[22] Filed: Jan. 27, 1993

[30] Foreign Application Priority Data

Feb. 12, 1992 [JP] Japan ............... 4-005219[U]
Sep. 4, 1992 [JP] Japan ............... 4-062363[U]

[51] Int. Cl.$^5$ .............................. F16G 11/00
[52] U.S. Cl. ...................... 24/115 G; 24/136 R
[58] Field of Search ........... 24/115 H, 115 G, 135 R, 24/135 N, 136 R

[56] References Cited

U.S. PATENT DOCUMENTS

| 1,379,093 | 5/1921 | Freeberg | 24/115 G |
| 1,639,278 | 8/1927 | Wharton et al. | 24/115 G |
| 3,177,456 | 4/1965 | Haydu et al. | 24/135 R X |
| 3,271,510 | 9/1966 | Decker et al. | 24/115 G X |
| 3,372,366 | 3/1968 | Cochrum | 24/135 R X |
| 4,506,417 | 3/1985 | Hara | 24/115 G |
| 4,675,948 | 6/1987 | Bengtsson | 24/115 G |
| 4,794,673 | 1/1989 | Yamaguchi | 24/115 G |

FOREIGN PATENT DOCUMENTS 0174498 3/1986 European Pat. Off.
2178790 2/1987 United Kingdom.

Primary Examiner—James R. Brittain
Attorney, Agent, or Firm—Hill, Steadman & Simpson

[57] ABSTRACT

The cord stopper comprises: a plug having a plug head, a neck projecting centrally from a rear surface of the plug head and a plate-like cord clamp attached to a distal end of the neck substantially perpendicularly thereto; a socket having centrally in its bottom a recess and a pair of sidewalls located on opposite sides of the recess, the recess having a depth greater than the thickness of the cord clamp for receiving the cord clamp, the sidewalls having two pairs of cord thru-holes, the pair of cord thru-holes of one of the sidewalls being axially aligned with the pair of cord thru-holes of the other sidewall for threading therethrough a cord; and moving means located between the plug and the socket for moving the cord clamp forwardly and backwardly in the recess.

4 Claims, 4 Drawing Sheets

CORD STOPPER

BACKGROUND OF THE INVENTION

Field of the Invention

The present invention relates to a cord stopper for holding an opening of a garment, a bag or any other daily good in an open or closed position by securing a suitable cord attached to the opening.

Description of the Related Art

The most widely used conventional cord stopper comprises a piece of wood or synthetic resin of a suitable shape with two parallel cord thru-holes formed in it. However, it is well known that cord stoppers having this kind of construction do not secure the the cords in a satisfactory manner.

This way of reliably fixing cord is proposed in, for example, Japanese Patent Publication No. Hei 2-23163 and Japanese Utility Model Publication No. Hei 2-28736. The Japanese Patent Publication No. Hei 2-23163 discloses a cord stopper which comprises two parts, an open ended tubular outer case and a resilient serrated thin plate. An opening is formed at the center of the outer case with triangular projections lying on both sides of it. A cylindrical projection is also formed at the center of the resilient thin plate and partition strips lying parallel to the cylindrical projection are formed at both ends of the resilient thin plate. The cord stopper is then assembled by putting the resilient thin plate along with the cylindrical projection into the outer case so as the cylindrical projection projects outwards from the opening in the outer case. The cylindrical projection is then pushed into the opening thus flexing the resilient thin plate and creating the desired gap between the inner wall of the outer case and the resilient thin plate. The two cords are then input into the outer case from both sides of the cylindrical projection. By releasing the cylindrical projection the resilient thin plate is returned to its original shape, and the cords are sandwiched into wedge shapes by being caught between the resilient thin plate and the inner wall of the outer case and are thus held firmly in place. The puller can then be positioned again by pushing the cylindrical projection into the opening which will again flex the resilient thin plate.

On the other hand, the Japanese Utility Model Publication No. Hei 2-28736 proposes a cord stopper comprising a front part which has an open ended wide grooved surface with a hole in its center, around which there is a screw guide, and a rear closure into which the wide groove fits with a screw which screws into the hole via the screw guide. If the screw is unscrewed, the cords can be threaded into the cord stopper, and the cord stopper can be moved to the desired position. If the screw is then tightened, the cords will be held firmly between the front part and the rear closure.

According to either of the above publications, the cords will be reliably held in place by the cord pullers.

With the cord stopper put forward in the Japanese Patent Publication No. Hei 2-23163, the work of inserting the resilient thin plates into the outer cases is laborious, and pushing the cylindrical projection too hard will cause the resilient thin plate to come out of the outer case. Also, with the cord stopper put forward in the Japanese Utility Model Publication No. Hei 2-28736, having to screw and unscrew the screw each time there is a desire to move the cord stopper is also laborious.

With the puller disclosed in the above publication, as the region through which the thread runs is open for both cases, there is a difficulty whereby if a looped portion of, for example, a cord tie is inserted into the cord stopper, it can be difficult to pull it out again.

SUMMARY OF THE INVENTION

The present invention thus proposes a cord stopper which eliminates the above problems, is simply assembled, has easy moving and fixing operations and holds the cord in a reliable manner once fixed.

The above problems can be overcome by a cord stopper comprising: a plug having a plug head, a neck projecting centrally from a rear surface of the plug head and a plate-like cord clamp attached to a distal end of the neck substantially perpendicularly thereto; a socket having centrally in its bottom a recess and a pair of sidewalls located on opposite sides of the recess, the recess having a depth greater than the thickness of the cord clamp for receiving the cord clamp, the sidewalls having two pairs of cord thru-holes, the pair of cord thru-holes of one of the sidewalls being axially aligned with the pair of cord thru-holes of the other sidewall for threading therethrough a cord; and moving means located between the plug and the socket for moving the cord clamp forwardly and backwardly in the recess.

More specifically, the plug head and the plate-like cord clamp are respectively secured to the neck and a compression spring is selected as the moving means. The plug head has at least two locking projections and either the plug head or the plate like clamp is attached to the neck in a rotatable manner. The locking projections engage with the hook shaped locking cutouts which are formed in the upper portion of the socket side wall. In another possibility for the case of a compression spring, the plug head and the neck are formed as one body and the cord clamp is rotatably attached to the neck. A further possibility for the moving means consists of a screw fixed to the lower end of the neck on the same vertical axis as the neck, with a threaded screw hole formed at the center of the lower portion of the socket.

It is also possible to replace the compression spring with a tension spring. The screw and screw hole could also be replaced by threading a combination of the outer edge surface of the plug head and a inner or outer surface of the socket and then using these threads as the moving means.

In an alternative form, the socket may have in another pair of opposite sidewalls cutouts communicating with the respective cord thru-holes so that the cords can be inserted into and removed from the cord thru-holes via the cutouts.

For example, in the case where a compression spring is used as the moving means, the plug is pushed against the bias of the spring so as the cord clamp fits into the recess in the socket. The cord clamping projections are a slight hindrance to this insertion process but as their lower surfaces are tapered the cord clamp can be guided into the recess by these tapered surfaces without difficulty. If the fastening plug is then released after having been pushed by hand into the socket, the force from the compression spring attempts to send the plug flying upwards out of the socket. However, at this time the cord clamping projections of the cord clamp catch on the cord thru-holes, thus keeping the plug inside the socket.

In order to attach the cords to the cord stopper, the plug must be pushed down against the force of the spring until it reaches the bottom surface of the socket. This will align the gap between the plug head and the cord clamp with the cord thru-holes. It will then be possible to thread the cords through the cord thru-holes via the gap. After this, the pressure applied to hold the plug head down is released, and the fastening plug, which still has the cords running through the gap, is forced upwards by the compression spring away from the lower surface of the socket. The portions of the cords which remain inserted between the front and rear thru-holes are then bent into a wedge shape by the upper surface of the cord clamp as a result of the upward motion of this cord clamp. The cords are then firmly gripped by the cord clamp and the thru-holes, making it virtually impossible to move the cord stopper out of its desired position.

According to the first modification, when the cord stopper is to be moved to and then held at a new fixed position within the cord stopper, the plug head is depressed and then released slightly Then the cord stopper is moved to its preferred position, and the plug head 1a is turned along the direction of the horizontal portion of the locking groove and the locking projections are thus rotated into the locking cutout. As a result of this, the plug head does not move away from the lower surface of the socket, and the cords are reliably held by the cord stopper.

In the second modification, the cords are input into the gap between the plug head and the cord clamp within the socket via the cord thru-holes at the front and back of the socket, where they then rest on top of the cord clamp. Thus, upon turning the plug head, the cord can be held or released by the lower surface of the cord clamp which acts as a fulcrum to the cord thru-holes. By then stopping the rotation of the plug head when the plug is at the desired position within the socket, the cord can be held by bending it into a wedge shape, or released, as desired.

With the alternative arrangement, since the socket has in another pair of opposite sidewalls cutouts communicating with the respective cord thru-holes, the cords can be inserted into the respect cord thru-holes via the cutouts rather than from the front ends of the cord thru-holes.

DETAILED DESCRIPTION

Figure 1:
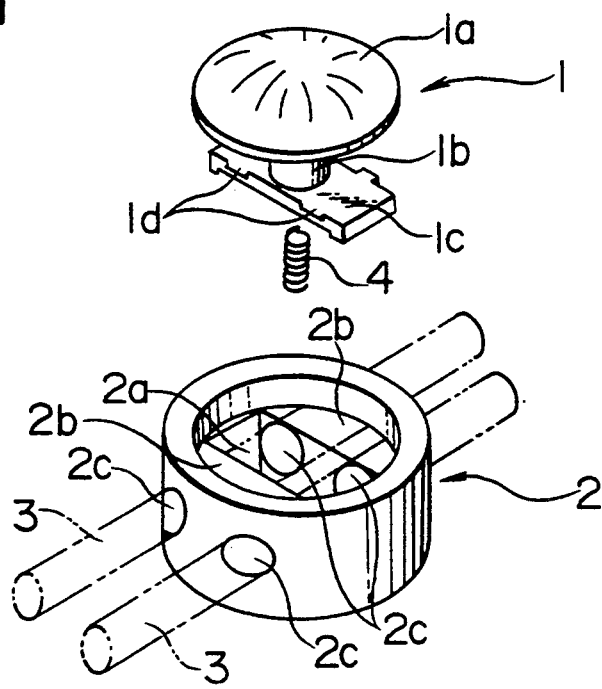
FIG. 1 is an exploded perspective view of a cord stopper for a typical embodiment of the present invention.
Figure 2:
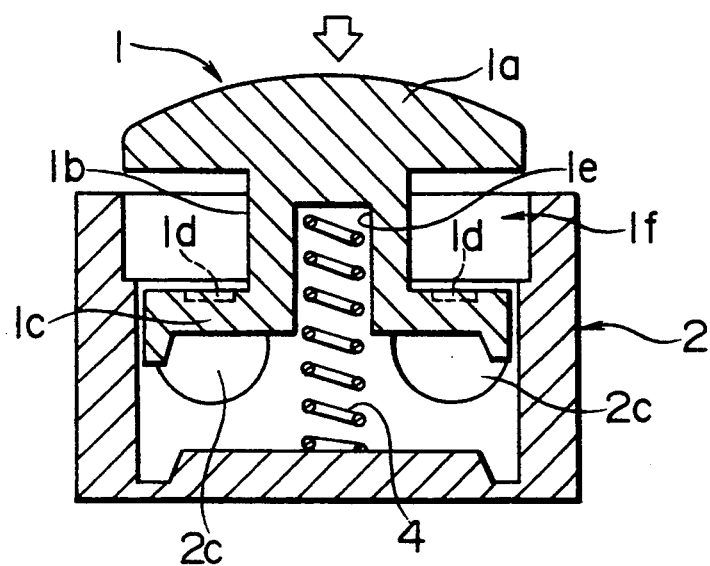
FIG. 2 is a cross-sectional view of the same cord stopper.
Figure 3:
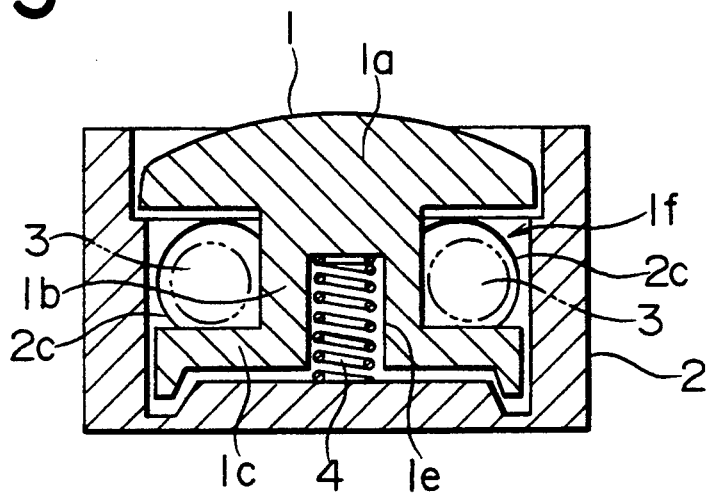
FIG. 3 is a cross-sectional view describing the operation of the cord stopper after the cords have been attached.

The following is a detailed description of the present invention based on a preferred embodiment shown in the accompanying drawings. FIG. 1 is an exploded perspective view of a typical embodiment of a cord stopper for stopping cord for the present invention. FIG. 2 is a vertical cross-sectional view for the same cord stopper and FIG. 3 shows a vertical cross-sectional view of the condition of the cord stopper before the cord has been held.

Figure 4:
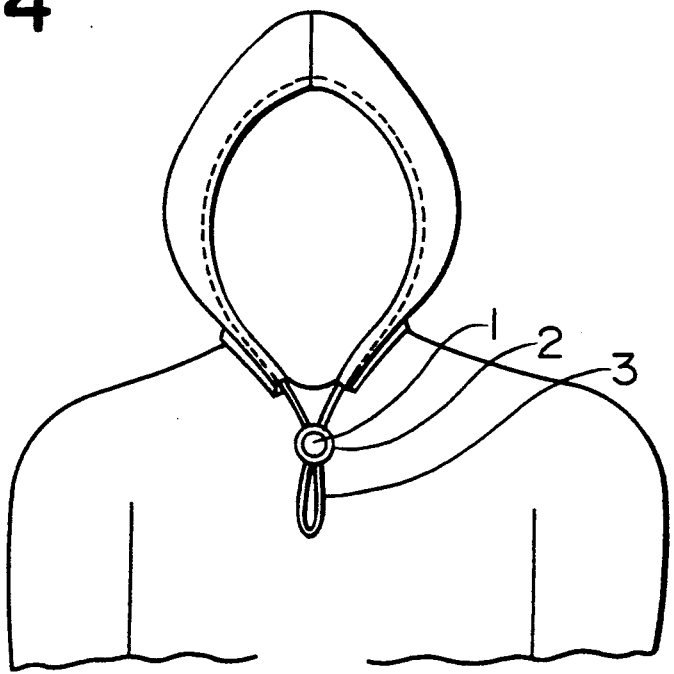
FIG. 4 is a front view of a portion of a garment to which the cord stopper in the present invention has been attached.

As is shown in FIG. 4, the cord stopper in the present invention is attached to both ends of a cord which runs through the edge of an opening in, for example, a knapsack or rucksack, or the hood of a parker or jumper. By operating this cord stopper to open and close the cord, the openings of items such as bags or clothing can be fixed in an open or closed position.

In this embodiment, the fastening plug 1 and the socket 2 for the cord stopper are made from synthetic resin. Two lengths of cord 3 pass through the socket 2, and can be held firmly in place within the socket 2 by the fastening plug 1 and will thus not fall out of the socket 2.

The plug 1 includes a circular plug head 1a with a neck portion 1b projecting perpendicularly from the surface of its central portion. A cord clamp 1c in the form of a rectangular plate is attached across the lower end of the neck 1b and runs parallel to the surface of the fastening plug 1. Also, there are two pairs of projections 1d on the opposing longitudinal sides of the clamp 1c, the lower sides of which are tapered. There is also a spring insertion hole 1e sunk into the center of the lower surface of the clamp 1c which extends into the middle of the neck 1b.

The socket 2 comprises a circular tube closed at its lower end with a recess 2a in the middle of this closed lower end, sandwiched between two lower inner ledges 2b. The cord clamp 1c then fits into the recess 2a and the two pairs of projections 1d engage with the sidewalls 2b. The two cords are then threaded horizontally through the socket 2 via their corresponding pair of cord thru-holes 2c.

The fastening plug 1 and the socket 2 are then assembled by inserting the compression spring 4 into the spring insertion hole 1e. The cord clamp 1c of the fastening plug 1 is then inserted into the recess 2a in the socket 2 against the bias of the compression spring 4. The fastening plug 1 is then pushed into the socket 2 in the manner indicated by the arrow in FIG. 2. The cord clamping projections 1d are a slight hindrance to this insertion process but as their lower surfaces are tapered the cord clamp 1c can be guided into the recess 2a by these tapered surfaces without difficulty. This compression spring 4 provides the moving means for the present invention. If the fastening plug 1 is then released after having been pushed by hand into the socket 2, the force from the compression spring 4 attempts to send the plug 1 flying upwards out of the socket 2. However, at this time the cord clamping projections 1d of the cord clamp 1c catch on the cord thru-holes 2c. The fastening plug 1 is then held within the socket 2 in the manner shown in FIG. 2.

In order to attach the cords 3 to the cord stopper, as is shown in FIG. 3, the plug 1 must be pushed down against the force of the spring 4 until it reaches the bottom surface of the socket 2. This will align the gap 1f between the plug head 1a and the cord clamp 1c with the cord thru-holes 2c. It will then be possible to thread the cords 3 through the cord thru-holes 2c via the gap 1f. After this, the pressure applied to hold the plug head 1a down is released, and the fastening plug 1, which still has the cords 3 running through the gap 1f, is forced upwards by the compression spring 4 away from the lower surface of the socket 2. The portions of the cords 3 which remain inserted between the front and rear thru-holes 2c are then bent into a wedge shape by the upper surface of the cord clamp 1c as a result of the upward motion of this cord clamp 1c. The cords 3 are then firmly gripped by the cord clamp 1c and the thru-holes 2c, making it almost impossible to move the cord stopper out of its desired position.

In this embodiment, a compression spring 4 has been employed as the moving means, but in the present invention it would also be possible to replace this compression spring 4 with a tension spring installed into the same area. In this case the projections 1d projecting out from the outer circumference of the cord clamp 1c would be unnecessary, with the fastening plug 1 and the socket 2 simply being held together by the tension spring. Here, the cord clamp 1c will be held close to the lower surface of the socket 2. The cords 3 can then be ran through the cord thru-holes 2c and the cord stopper can be moved simply by raising up the plug head against the bias of the tension spring. Then, in order to fix the cord within the cord stopper, the plug head 1a is released so that the cord clamp 1c is pulled down towards the lower surface of the socket 2 by the force of the tension spring. The cords 3 are then secured by being bent into a wedge shape by being caught between the lower surface of the cord clamp 1c and the lower surface of the socket 2.

Figure 5:
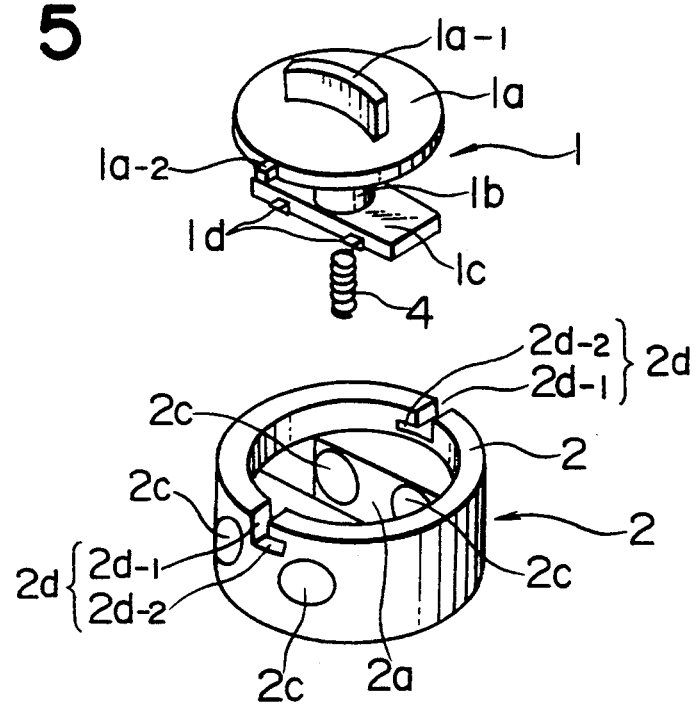
FIG. 5 is an exploded perspective view of a cord stopper for a modification of the present invention.
Figure 6:
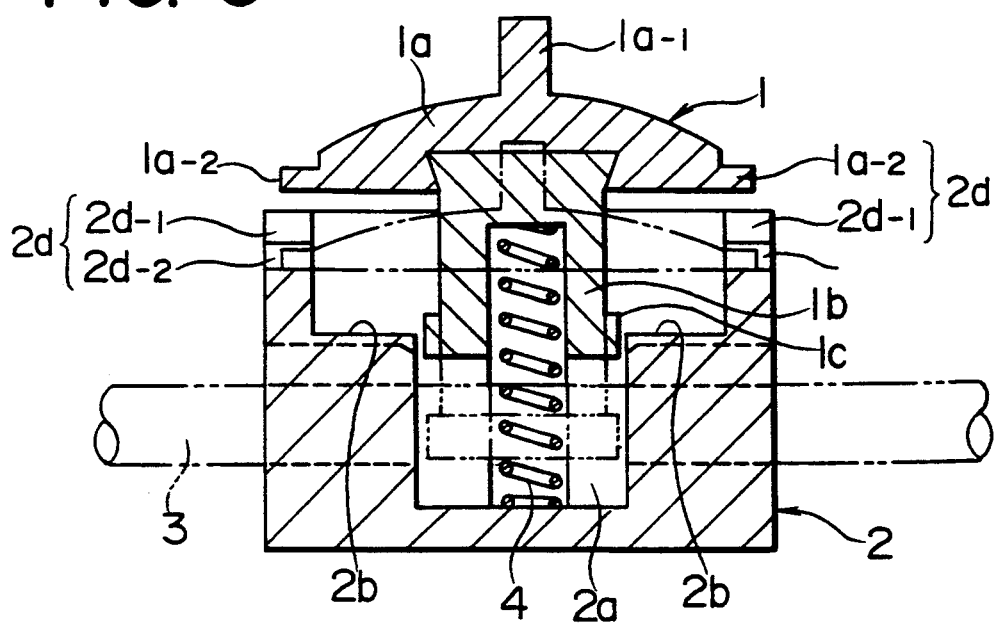
FIG. 6 is a cross sectional view describing the operation of the same cord stopper.

FIGS. 5 and 6 show a modification of the present invention. In this modification, the plug head 1a, the neck 1b and the cord clamp 1c for this cord stopper are of the same shape as those for the cord stopper in the aforementioned embodiment. However, in this modification the plug head 1a is constructed separately from the neck 1b and the cord clamp 1c in such a way so as the plug head 1a can be rotated with respect to the neck 1b and the cord clamp 1c about the central axis of the neck 1b. There is also a grip 1a-1 to enable the plug head to be gripped by hand, projecting from the surface of the plug head 1a. In addition to this, there are at least two or more locking projections 1a-2 projecting radially at predetermined intervals from the outer edge of the plug head 1a.

The basic construction of the socket 2 is the same as that of the socket for the aforementioned embodiment shown in FIGS. 1 to 3. However, in this modification at least two or more locking cut-outs 2d are formed in the end of the upper wall at a distance corresponding to the locking projections 1a-2. These locking cut-outs are formed in the shape of a hook, with a horizontal portion 2d-2, and a vertical portion 2d-1, as shown in FIG. 5.

According to this modification, when the cords 3 are to be held in a fixed position within the cord stopper, the plug head 1a is turned and then released slightly, as with the aforementioned embodiment. Assuming, after assuming the posture indicated by the phantom lines in FIG. 6, the cord stopper is moved to its predetermined position. Then, the plug head 1a is turned along the direction of the horizontal portion 2d-2 of the locking groove 2d by taking hold of the grip 1a-1 and the locking projections 1a-2 are thus rotated into the vertical cutout 2d-1. As a result of this, the plug head 1a does moves away from the lower surface of the socket 2, and the cords 3 are reliably held by the cord stopper.

It is also possible in this modification, as was the case with the aforementioned embodiment, to employ a tension spring instead of a compression spring, although this is not shown in the diagrams. In this case also, the cord clamping projections become unnecessary. However, when interlocking the locking cut-outs 2d and the locking projections 1a-2, it is necessary to ensure that the distance between the cord clamp 1c and the lower surface of the socket 2 is of a size which will guarantee that the cords 3 are firmly gripped between these surfaces.

Figure 7:
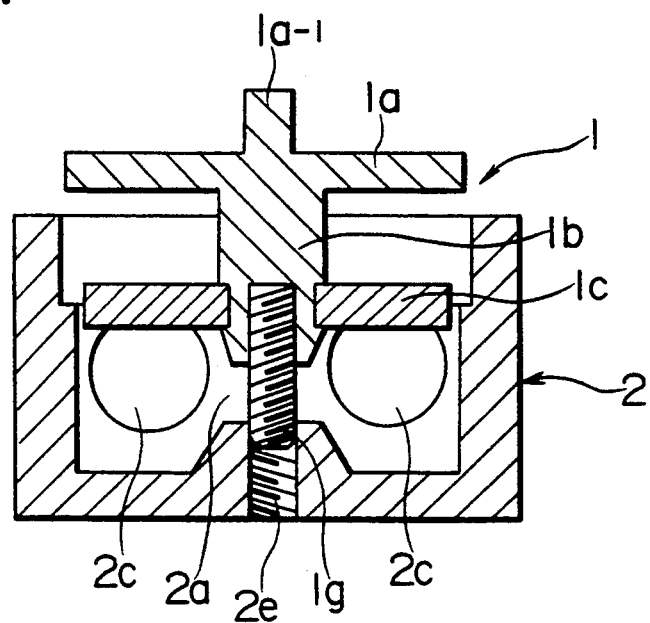
FIG. 7 is a cross-sectional view of a cord stopper for a further modification of the present invention.

FIG. 7 shows a further modification of the present invention. In the plug head 1a in this example, the locking projections 1a-2 which came out from the plug head 1a in the aforementioned example have been removed, and the plug head 1a along with the neck 1b have become one body. The cord clamp 1c is attached to the neck 1b in such a way as to be able to rotate freely, and there is a screw 1g projecting from the lower end of the neck 1b on the same vertical axis as the neck.

There is a threaded screw hole 2e for the screw 1g at the center of the lower portion of the socket 2, but otherwise the construction of this socket 2 is mostly the same as that for the embodiment shown in FIGS. 1 to 3.

In this construction, the plug head 1a and the cord clamp 1c fit into the socket 2. The cords 3 then run under the cord clamp 1c via the cord thru-holes 2c. By then rotating the plug until it can no longer be rotated, the rotation of which can be arbitrarily selected to either secure or release the cords 3, these cords 3 can be securely held by the fastening plug 1 and the socket 2. In this modification, as with the aforementioned example, the cords are secured by sandwiching them between the lower surface of the cord clamp 1c and the lower surface of the socket 2.

Furthermore, although this is omitted from the diagrams, there is a further alternative to the screw 1g and the screw hole 2e. For example, the surface of the outer edge of the plug head 1a and the inner surface of the upper edge wall of the socket 2 could be made to have corresponding threaded surfaces. The plug head 1 would then screw into the socket 2 and thus it would be possible to move the fastening plug 1 towards and away from the socket 2 simply by turning the plug head 1a. It is consequently also possible to have the outer surface of the socket 2 threaded, and have a corresponding threaded surface on the inner edge wall of a tray shaped plug head 1a.

Figure 8:
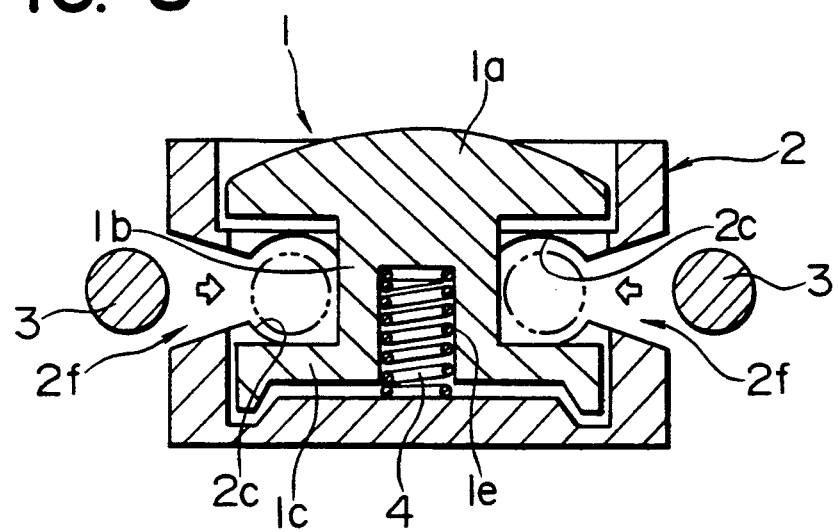
FIG. 8 is a cross-sectional view of a cord stopper for a still further modification of the present invention.

FIG. 8 shows an alternative form of the foregoing embodiments of FIGS. 1 to 3. In this alternative form, the socket 2 has in another pair of opposite sidewalls cutouts 2f laterally communicating with the respective cord thru-holes 2c. Each of the cutouts 2f has upper and lower inner surfaces tapered so as to diverge outwardly, and the gap between the inside edges of the upper and lower inner surfaces on the thru-hole side is such that the cords 3 can be narrowly threaded threrethrough. According to this alternative arrangement, it is possible to thread the cords 3 through the respective cord thru-holes 2c laterally from the cutouts 2f of the socket 2 rather than from the front ends of the cord thru-holes 2c, thus making the cord attaching operation simple.

Also in the embodiments of FIGS. 6 and 7, the socket may have the cutouts 2f. The above embodiment and modifications have been described using circular plug heads and sockets, but it is also possible to use various fashionable shapes.

As is apparent from the above description, in the present invention, the way in which the cords 3 are attached to the cord stopper is very simple, as is the cord holding operation. The bending of the cords into a wedge shape by the cord stopper when fixing the cord also ensures that the holding operation is sufficiently secure. Since the looped portion formed when the cord is inserted into the cord stopper via the cord thru-holes occurs outside the cord stopper, problems such as those mentioned for, for example, ties, no longer occur. Particularly if the socket has in another pair of opposite sidewalls cutouts communicating with the cord thru-holes, it is possible to thread the cords through the respective cord thru-holes laterally along the cutouts rather than from the front ends of the cord thru-holes, thus making the cord attaching operation simple.

What is claimed is:

1. A cord stopper comprising:
    a plug having a plug head, a neck projecting centrally from a rear surface of said plug head and a plate-like cord clamp attached to a distal end of said neck substantially perpendicularly thereto and having two respective pairs of projections on the opposed longitudinal sides of said clamp, the lower-facing sides of said projections being tapered;
    a socket having centrally in its bottom a recess and a pair of sidewalls located on opposite sides of said recess, said recess having a depth greater than the thickness of said cord clamp for receiving said cord clamp, said sidewalls having two pairs of cord thru-holes, said pair of cord thru-holes of one of said sidewalls being axially aligned with said pair of cord thru-holes of the other sidewall for threading therethrough a cord; and
    moving means located between said plug and said socket for moving said cord clamp forwardly and backwardly in said recess wherein said cord clamp fits downwardly into said recess for said two pairs of projections to engage with the upper inner surfaces of said thru-holes.

2. A cord stopper according to claim 1, wherein said plug head and said cord clamp are fixed to said neck, said moving means being a compression spring.

3. A cord stopper according to claim 1, wherein said socket has in another pair of opposite sidewalls cutouts communicating with said cord thru-holes so that the cords may be inserted into and removed from said cord thru-holes via said cutouts.

4. A cord stopper according to claim 1, wherein said plug head has at least two edgewise-extending locking projections, said plug head being rotatably attached to said neck, said socket having in its upper side wall portion at least two hook-shape locking cutouts with which said locking projections are engageable, and said moving means is a compression spring.

* * * * *